June 23, 1964
C. J. DETTLING ETAL
3,138,483
APPARATUS FOR COATING INTERIOR OF HOLLOW BODY
Filed Jan. 11, 1960
3 Sheets-Sheet 1
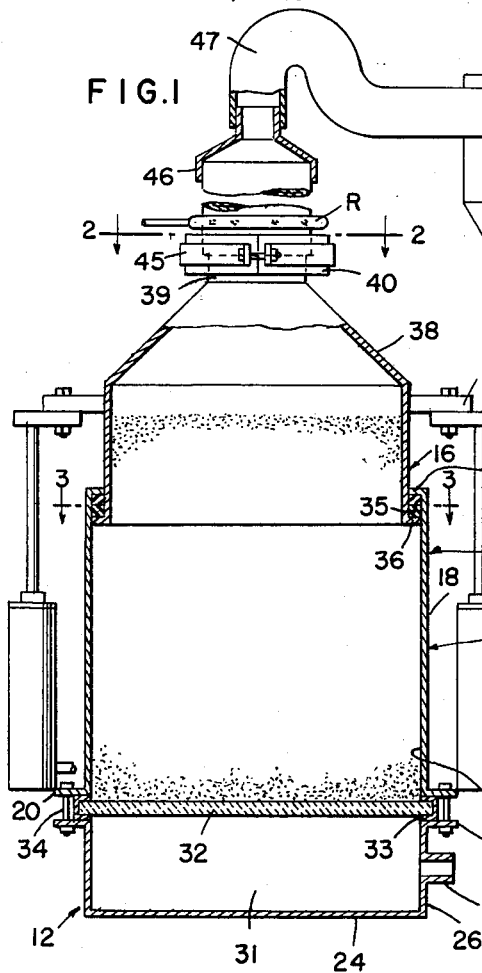
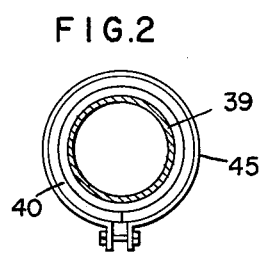
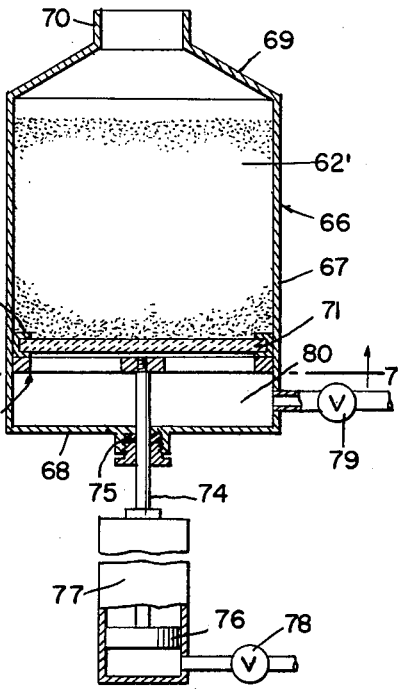
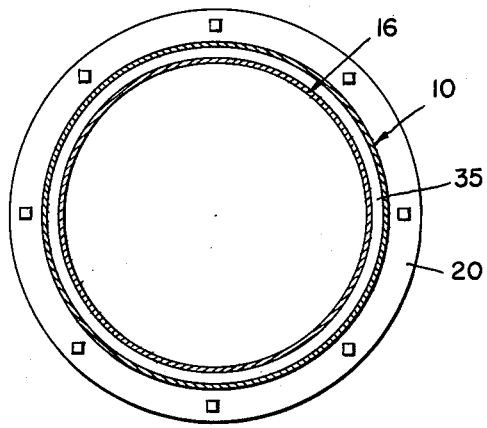
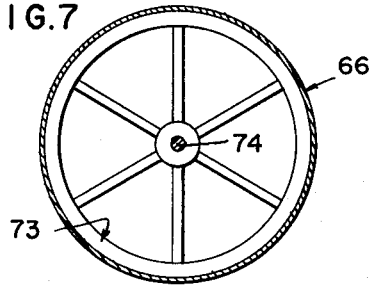
INVENTORS
Conrad J. Dettling
BY Carl W. Dames, Jr.
Richard O. Church
Attorney June 23, 1964 C. J. DETTLING ETAL 3,138,483
APPARATUS FOR COATING INTERIOR OF HOLLOW BODY
Filed Jan. 11, 1960 3 Sheets-Sheet 2
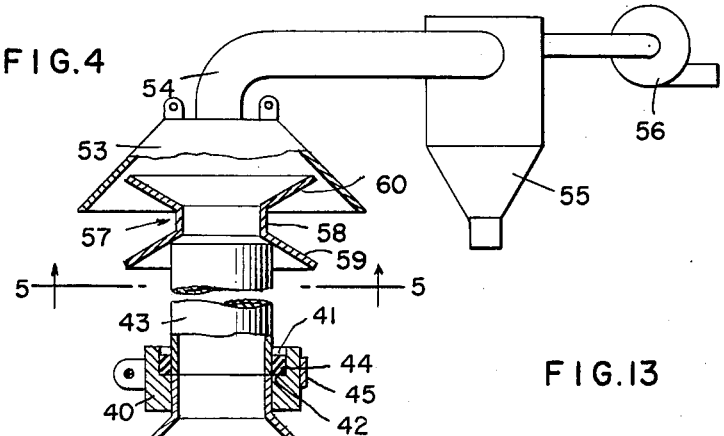
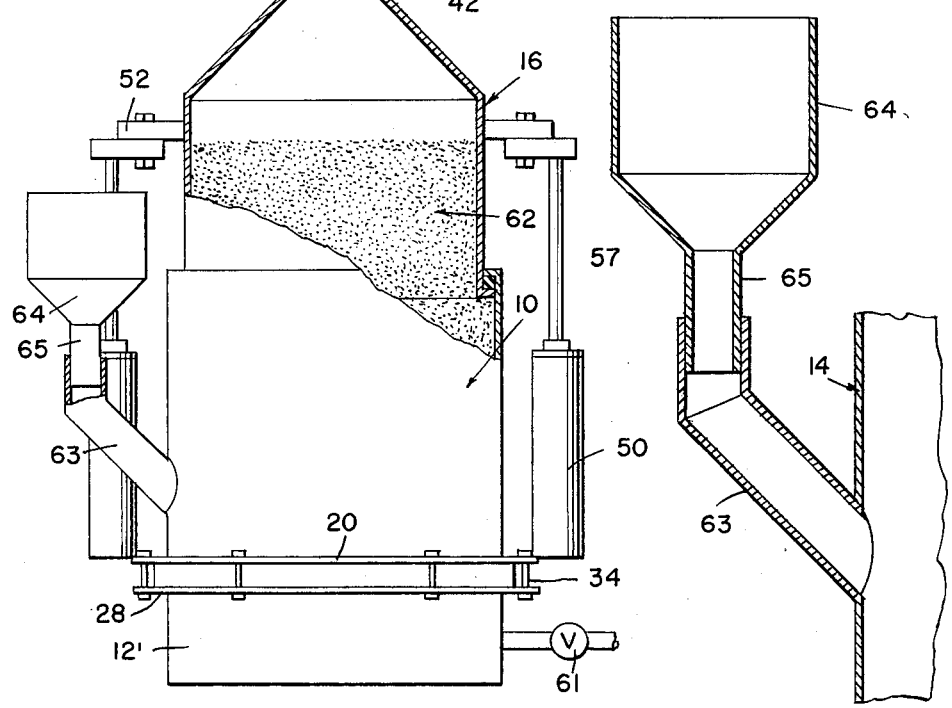
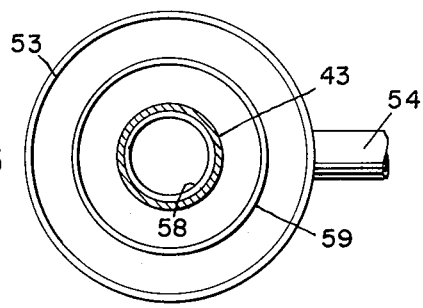
INVENTORS
Conrad J. Dettling
BY Carl W. Dames, Jr.
Richard O. Church
Attorney June 23, 1964  C. J. DETTLING ETAL  3,138,483

APPARATUS FOR COATING INTERIOR OF HOLLOW BODY

Filed Jan. 11, 1960  3 Sheets-Sheet 3

INVENTORS
Conrad J. Dettling
BY Carl W. Dames, Jr.

Richard O. Church
Attorney

# United States Patent Office 3,138,483
Patented June 23, 1964

3,138,483
APPARATUS FOR COATING INTERIOR
OF HOLLOW BODY
Conrad J. Dettling and Carl W. Dames, Jr., Reading, Pa.,
assignors, by mesne assignments, to Polymer Processes,
Inc., Reading, Pa., a corporation of Pennsylvania
Filed Jan. 11, 1960, Ser. No. 1,592
3 Claims. (Cl. 118—408)

This invention relates to a method and apparatus for applying protective coatings to interior surfaces of hollow bodies, such as pipes and the like.

A particular object of the present invention is to provide novel means of applying coatings and linings to the interior of hollow bodies or articles for protecting the interior surfaces thereof against damage, where such articles may be exposed to the effects of destructive or corrosive fluids, solvents or chemicals, or where the article must be protected against mechanical abrasion or frictional wear, or must be insulated for protection against the action of electrical currents.

Materials which possess superior resistance to chemicals or solvents or which are electrical insulators or which are resistant to mechanical abrasion or frictional wear, often are quite expensive and do not possess sufficient mechanical strength and rigidity for use other than as coatings for mechanical structures. Additionally, the very resistance to solvents and other chemicals for which these materials may be of value in the form of corrosion preventing layers upon a surface, often make them difficult to apply by presently known methods to form desired coatings, such as by painting or spraying in a liquid solvent or in liquid dispersion form.

Accordingly, it is another object of the present invention to provide a new and improved process and apparatus whereby superior internal coatings may be formed or produced upon hollow articles without the necessity of using liquid solvents or dispersing agents for the coating materials.

A still further and important object of the present invention is to provide an improved process and apparatus which is especially suitable for the coating of elongate hollow articles such, for example, as all kinds of pipes and tubing, tubular sleeves, sleeve bearings, ventilators and ducts; pump chambers and cylinders; retorts, autoclaves, processing vats and chambers, tanks and vessels, tin can bodies, electrical fittings, conduits, including those used for electric wiring, and bellows.

The invention of this application is particularly valuable in connection with the production of adherent linings and coatings from high-melting high-molecular weight organic polymeric thermo-plastic resins, such as polyethylene and the linear polyamides generally referred to as nylons. Nylons which are particularly useful are polyhexamethylene adipamide, polyhexamethylene sebacamide and the polycaprolactams, such as the polymer of epsiloncaprolactam. However, the protective coatings which may be used may consist of practically any material which has (1) a transient temperature decomposition point which is reasonably higher than its sintering temperature and (2) a sintering temperature lower than the melting or deterioration point of the material from which the particular articles to be coated are made.

Among other coatings which are suitable for use in accordance with the present invention are most of the thermo-plastic resins, or those having a thermo-plastic phase and especially those which have a transient decomposition temperature which is sufficiently removed from the melting temperature thereof to permit the material to be applied to the article to be coated, by melting.

Specific examples of additional materials useful for this purpose are polystyrenes, acrylic resins, bitumen such as gilsenite or asphalt, shellac and wax.

Various compatible mixtures of two or more of the above materials may also be employed for the production of coatings in accordance with the process of the present invention. In cases where one of the materials in a coating mixture has a melting point which is substantially below the others, the low melting material acts somewhat as a binder and the high melting materials act as fillers. Various other filler materials may also be added to any of the selected coatings for various purposes such as to impart desired properties or to reduce the cost of the coating materials. Examples of suitable filling materials are powdered asbestos, slate, metal powders, heat stable powdered pigment materials, and polytetrafluoroethylene.

The coating material should preferably be pulverulent in order that it may be readily fluidized, as explained below. In addition it should be capable of being mixed without appreciable packing or cohesion of the particles into aggregates.

In carrying out the coating process in accordance with and by means of the apparatus of the present invention, the coating material, preferably in the form of pulverulent granules, is transformed into a continuously fluidized bed, by introducing at least one current of gas under pressure thereinto; the bed being maintained in a fluidized state by controlling the flow of the gas. The hollow article to be coated is preheated and the pulverulent material while being maintained in the fluidized state, is caused to move into the article to be coated so as to contact the entire inner surface of the hollow article or a selected portion of such surface where it may be desired to coat only a portion thereof. The article preferably is contacted for a relatively short time and the material while being continuously fluidized, is caused to partially or fully fill and empty from the article in a rapid manner. Individual particles of the coating material adhere and melt and fuse together with other particles on the hot surface of the article forming the confining walls of the fluidized moving bed to form a continuous coating on such walls, as herein more fully described.

A fluidized bed, as used in the present specification, is defined as a mass of solid particles which exhibits the liquid-like characteristics of mobility, hydrostatic pressure and an observable upper free surface or boundary zone across which a marked change in concentration of particles occurs.

Such a fluidized bed is illustrated and described in Patent No. 2,844,489.

It is a further object of the present invention to provide a novel structure by means of which the coating material while being maintained constantly fluidized, may be mechanically elevated from the fluidizing receptacle into the heated article which is to be coated so that articles of substantial size interiorly or of substantial length may have the interior surface thereof coated without the necessity of employing excessive gas pressure to move the material into the article.

More specifically the objects of the present invention are accomplished by the provision of a fluidizing tank or compartment into which gas under pressure is introduced from below the body of pulverulent coating material therein, with means for effecting the reduction in size of the chamber in which the fluidized material is contained whereby such fluidized material is caused to rise from a suitable opening in the top of the chamber and pass into the hollow articles to be coated and the emptying of the hollow article being brought about by expanding or enlarging the chamber whereby to reverse the process to permit the material to return from the hollow article into the expanded chamber therebeneath.

In the drawings:

FIG. 1 is a view partly in elevation and partly in vertical section, with parts broken away, through one form of apparatus by means of which the present invention may be realized.

FIG. 2 is a horizontal section taken substantially on the line 2—2 of FIG. 1.

FIG. 3 is a horizontal section taken substantially on the line 3—3 of FIG. 1.

FIG. 4 is a view partly in side elevation and partly in vertical section through a second form of the apparatus.

FIG. 5 is a horizontal section taken substantially on the line 5—5 of FIG. 4.

FIG. 6 is a vertical sectional view, with a portion in elevation and broken away, of a third embodiment of the invention.

FIG. 7 is a horizontal section taken substantially on the line 7—7 of FIG. 6.

FIG. 13 is a sectional view on an enlarged scale and in vertical section through the described means for supplying pulverulent material to the fluidizing container.

Figure 8:
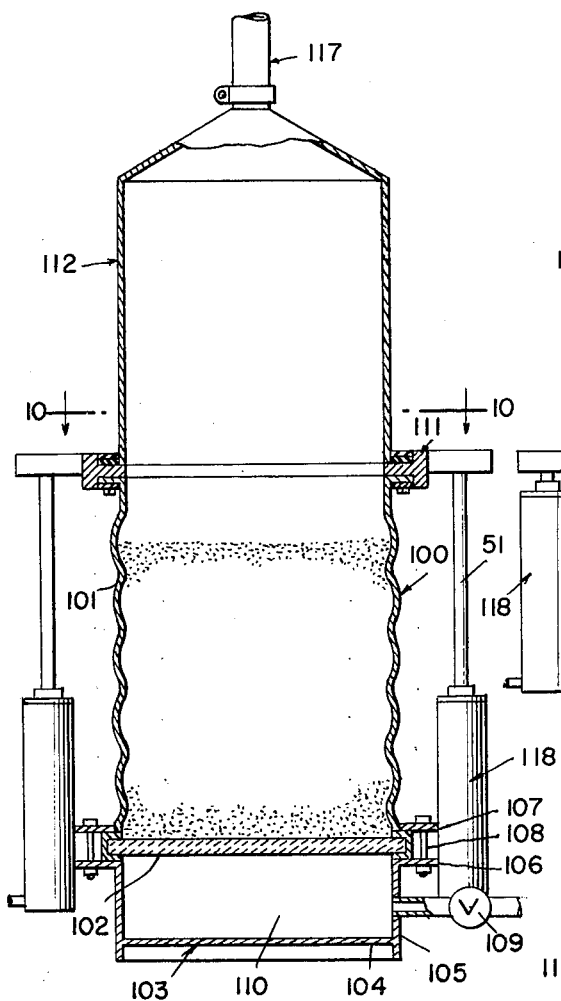
FIG. 8 is a vertical sectional view through a fourth embodiment of the invention with portions in elevation and showing the bellows-like container extended or in starting position.

One form of apparatus by means of which the present invention may be realized comprises, as illustrated in FIG. 1, a container or powder charged receptacle which is generally designated 10 with which is associated an air or gas chamber generally designated 12. This container, and those of modified forms of the structure hereinafter described, is designed so that the volume thereof may be increased and decreased for effecting the raising and lowering or elevation and reduction therein of the powder as required in working the process.

The container 10 consists of a lower portion 14 and an upper vertically movable portion 16. The lower portion is initially open at its bottom and the wall thereof is provided with an encircling outturned flange 20 while the top part of the portion 14 may have the inturned annular flange 22 integral with the wall 18 as shown, which snugly encircles the upper portion 16.

The air or gas chamber comprises the bottom wall 24, the upstanding side wall 26 and the outturned flange 28 which is integral with the wall 26 and this wall 26 is of approximately the same diameter as the portion 14, to the lower end of which it is secured.

The container portion 14 and the gas chamber lying therebeneath are horizontally divided into an upper powder filling area 30 and a smaller lower air or gas area 31 by means of a porous partition 32. This partition which should be pervious to gas introduced into the chamber area 31 and used for effecting the fluidizing of the coating material in the powder area 30, must be impervious to the particles of coating material and preferably takes the form of a porous ceramic plate although any other similar or suitable plate structure may be used. This porous partition plate 32 is secured between the opposing flanges 20 and 28 which flanges engage the periphery of the plate and are drawn together against a suitable gasket ring encircling the plate periphery as indicated at 33, by means of the connecting bolts 34.

A preferred porous plate is composed of an alundum refractory material composed of alumina grains bonded together with an aluminous glass at a high firing temperature. Whether composed of this or other materials, the porous plate preferably has a gas permeability which may be defined as that which will permit the passage of from 1 to 15 cubic feet of air at 70° F. and 25% relative humidity through an area of one square foot and a plate thickness of one inch at a pressure differential equivalent to two inches of water in a period of one minute. The average pore diameter of the porous plate should preferably be in the range from 0.003 to 0.004 of an inch or less.

The open lower end of the portion 16 is of a diameter to fit snugly within the lower portion 14 and is designed to be moved vertically therein for the purpose of increasing and decreasing the available powder containing area, which area, of course, extends into the upper portion in the manner illustrated. A suitable gasket 35 is positioned around the upper portion 16 beneath the flange 22 and may be located on an outturned flange portion 36 and this gasket, of course, maintains an air-tight seal between these portions. The air chamber or casing 12 is provided with means for admission of gas thereinto, as indicated at 37. This air admission means may be merely in the form of an opening or inlet nipple, where the apparatus is to be operated by drawing air through the top part thereof, as hereinafter described, or it may be in the form of a valved pipeline, where the apparatus is to be used by forcing air or other gas under pressure into the chamber 31.

The top of the portion 16 of the powder material container in the form of the apparatus under consideration, is reduced to an inverted funnel shape as indicated at 38, which leads into an upwardly directed nozzle 39.

For carrying out the process in the coating of pipes or similar elongated hollow bodies the neck 39 is provided with an encircling collar 40 which in the lower portion thereof closely encircles the neck and in the upper portion is internally enlarged to form the annular recess 41 having a bottom surface 42 upon which the lower end of an upright tubular body in the form of a pipe or the like, as indicated at 43, may be positioned or rested.

In order to maintain a sealing connection between the top end of the collar 39 and the lower end of the pipe body 43 a plastic or other suitable sealing ring 44 is placed within the recess 41 to encircle the pipe body. This sealing ring, while it may be of any suitable material, preferably is of the plastic Teflon.

There is also provided a suitable means for constricting the recessed upper portion of the collar 40 so as to establish the desired tight connection between the pipe and the Teflon seal, such as the split band 45.

The method of the present invention may be carried out either by introducing air or other gas under pressure into the chamber area 31 to pass upwardly into and fluidize the powder material therein, or, as previously stated, the body 12 may have the wall thereof provided with an unobstructed opening so that air may be freely drawn in by the application of suction or reduced pressure to the upper end of the pipe 43 and by this means effecting the fluidizing of the pulverulent coating material. In carrying out the method according to this latter procedure the top end of the pipe 43 may have fitted thereto a cap 46 which is connected with a suction tube 47 of suitable flexible character to permit the up and down movement of the cap with the pipe to which it is attached. This suction tube is preferably connected with a suitable cyclone receiver which is conventionally illustrated and generally designated 48 to which in turn is connected a valved pipeline 49 which is coupled with a suitable source of vacuum such as a vacuum pump or the like.

In the use of the apparatus thus far described, a suitable means is provided for raising and lowering the upper portion 16 of the powder container. While any suitable arrangement may be provided, the means here illustrated consists of a pair of air or hydraulic cylinders 50 located on opposite sides of the structure 10 and having the upper ends of piston actuated rods 51 attached to the wall of the portion 16 as by means of laterally extending ears 52 carried by such wall.

In another form of apparatus by which the present method may be worked, the hollow body coupled with the neck of the upper portion of the structure, has located thereabove a dust collecting hood 53 with the top portion of which is connected a carry-off pipe 54 leading to a conventional cyclone collector 55, the latter being connected in the conventional manner with a suction pump 56.

The upper end of the pipe shown in the second arrangement of the parts has connected therewith a powder overflow receiver which is generally designated 57. This receiver may be of any suitable form but is here illustrated as comprising a tubular body portion 58 carrying a downwardly flaring skirt 59 and an upwardly flaring flange 60. As shown, the top end of the pipe is positioned within the skirt 59 which rests upon the edge of the pipe and the upwardly flaring flange 60 is located beneath and may be partly within the hood 53.

Also in this other embodiment of the apparatus the air or gas receiving unit, here designated 12', has a valved pipeline 61 connected therewith whereby the flow of the gas under pressure into the chamber and through the ceramic plate, hereinbefore referred to, may be controlled.

The container for the pulverulent material 62 may be initially charged with a definite quantity thereof so as to bring the top or head of the powder when in fluidized state, approximately to the lower part of the conical part 38 of the upper portion of the apparatus and in order that the operation of the apparatus may be continued for a longer period than might be possible with one filling or charging of the container, a means is provided whereby continuous replacement of the powder material can be effected. One such means for providing for the continued replenishment of the material might comprise the provision of a conduit 63 extending outwardly and upwardly from the wall of the lower portion of the container and having communication with the interior of the latter, and a hopper 64 having a downwardly directed outlet pipe 65 telescopically joined with the upper end of the conduit 63. Means would be provided for raising and lowering the hopper 64, as required, so as to maintain the powder level therein approximately the same as the powder level within the container 10 of the apparatus. Thus as the powder in the apparatus becomes used, it may be replenished from the hopper. No means is illustrated for raising and lowering the hopper 64 but obviously such means might comprise air or hydraulic cylinders connected with the hopper in the same manner as those shown for the raising and lowering of the upper portion 16 of the material container.

In this second described form, using gas under pressure instead of suction as first described, it will be understood that the construction and arrangement of the parts of the container are the same as in the arrangement where the air is drawn in by suction and accordingly the same reference characters are used to designate the corresponding parts of the apparatus.

Another form of apparatus which may be employed for carrying out the present method comprises a means for raising the fluidized powder into the hollow article to be coated by supporting the fluidized powder bed on a vertically movable porous ceramic plate. Such an arrangement is illustrated in FIG. 6, where the powder container is generally designated 66. As shown, the container is in one piece or comprises a single unit having the wall 67, the bottom 68 and the upwardly tapering top or head 69 which terminates in a short upwardly extending neck 70 corresponding to the hereinbefore described neck 39.

The ceramic plate 71 is illustrated as being mounted to fit snugly within the container and the periphery of the plate has the gasket 72 therearound which is slidably positioned against the wall 67 and the plate is supported for up and down movement by a suitable spider ring 73. This spider ring is connected at its central portion with a vertically movable piston rod 74 which passes through a gasket packing 75 in the bottom wall 68 and is connected with a piston 76 operable in the cylinder 77. By means of air or other fluid introduced into the cylinder 77 by the valved pipeline 78, the piston 76 and accordingly the ceramic plate 71 may be raised and lowered in the powder filled area of the container 66.

The lower portion of the container 66 has a valved pipeline 79 connected therewith so that air or other suitable gas can be introduced to the area 80 below the ceramic plate. This area accordingly is analogous to the chamber area 31 hereinbefore described, into which the gas is forced or drawn to pass upwardly through the ceramic plate and into the bed of powder lying thereon.

With this latter structure it will be obvious that by introducing fluid into the piston cylinder 77 the bed 62' of the pulverulent material may be elevated as desired, during the time that the gas is being forced thereinto and the powder material is in a fluidized condition.

In the forms of apparatus hereinbefore described it will be seen that the structures are such that the mass of fluidized powder can be caused to rise or can be elevated by means other than by the force of the gas entering the same from beneath, into the restricted upper end or top portion of the powder container and by this means the powder can, of course, be made to rise into the hollow article which is to be coated.

Figure 9:
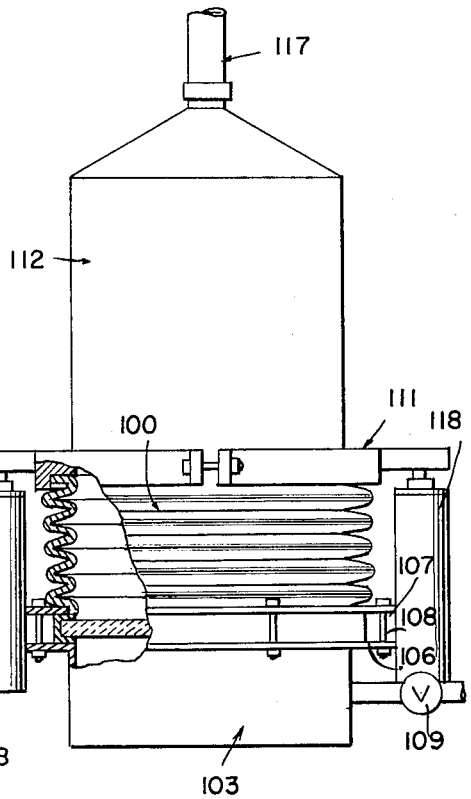
FIG. 9 is a view in elevation in the major part of the structure of FIG. 8 showing the bellows collapsed and partly in section.

Another form of apparatus suitable for this purpose is illustrated in FIG. 9, wherein the volume of the powder chamber is reduced or increased as desired for accomplishing a similar movement of the fluidized powder into the part which is to be interiorly coated.

In connection with the carrying out of the presently employed fluidized bed coating process, the articles to be coated are dipped into the fluidized bed, but it is impractical to submerge shell-like bodies or parts into a fluidized bed of particles in order to coat only the inside thereof since it is economically undesirable to have the coating on the part exterior as a byproduct of interior coating and the only sure method of preventing the outside coating of the article is to completely mask all exterior surfaces and this is costly and time-consuming. In view of this the present practice is to employ either particle spraying or extensive masking and these undesirable practices may be avoided or done away with by the utilization of the structure about to be described.

In this last mentioned structure the pulverulent powder container is generally designated 100 and has a wall structure 101 of bellows form whereby the powder containing area thereof may be decreased upon collapsing the wall structure to force the powder upwardly or to displace excess powder from the container or tank forming part or increased upon expanding the tank or container structure so as to cause the powder to return thereinto.

The wall structure 101 may be formed of any suitable resilient material which can be fabricated into a bellows-like tank or shell and the bottom edge of such wall is extended around the periphery of the ceramic wall plate 102 which forms the top of the gas or plenum chamber 103 which, as in the other described structures, comprises a bottom wall 104 and an upstanding side wall 105. The wall 105 has an outwardly extending surrounding flange 106 upon which the peripheral portion of the plate 102 rests with the encircling bottom edge of the wall 101 and a collar plate 107 encircles the bottom portion of the wall 101 and holds the same together with the peripheral portion of the ceramic wall plate 102 on or against the flange 106 by means of coupling bolts 108 which pass through the collar 107 and the flange 106 as shown. A valved gas supply pipe 109 leads into the area 110 beneath the ceramic plate 102.

The top edge of the wall 101 is secured to a ring 111 which is designed in a suitable manner to have secured thereto an open side or end of a hollow body which is to be interiorly coated. Such a hollow body is here generally designated 112 and is shown as having a circular open bottom end and a walled upper or opposite end which is provided at its central portion with an opening 113.

The ring 111 is illustrated as being of T cross section with the leg of the T forming an inwardly projecting annular flange 114 and the top edge of the flexible wall body 101 is secured to the underside of this flange in a suitable manner as at 115 while the top of the flange functions as a supporting surface for the hollow part 112 which has the edge of the wall thereof resting on the flange. The numeral 116 designates an air seal which encircles the hollow part 112 and lies between the latter and the adjacent upwardly extending portion of the surrounding ring 111.

The hollow part 112 when positioned on the ring 111 has the opening 113 directed upwardly as shown, and a venting conduit 117 is connected in a suitable manner to the part 112 in communication with the opening 113 to carry off air-borne particles of the powder material when the latter is caused to move into the interior of the part 112.

Figure 10:
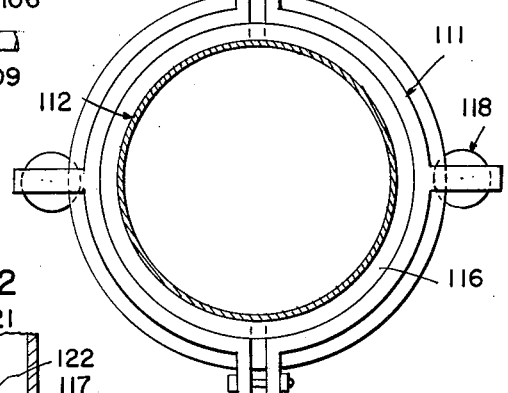
FIG. 10 is a horizontal section taken substantially on the line 10—10 of FIG. 8.
Figure 11:
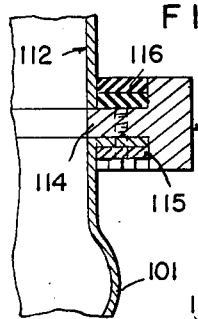
FIG. 11 is a detail section on an enlarged scale through the coupling ring between the bellows and the hollow body.
Figure 12:
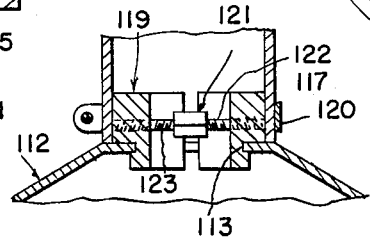
FIG. 12 is a detail section on an enlarged scale through the described form of locking collar for connection with the hollow body shown in FIGS. 8 and 9.

In the operation of the tank structure having the collapsed wall 101, the ring 111 to which the hollow part is secured is caused to move down so as to collapse the bellows wall as illustrated diagrammatically in FIG. 10. This collapsing of the structure may be accomplished by any suitable operating means connected with the ring 111 such as by the use of a pair of air or hydraulic cylinders, here generally designated 118 and of the same form as those previously referred to, and the piston rods of these units may be secured in a suitable manner to the ring 111 as, for example, as indicated at 52.

In connection with the operation of the apparatus in the several forms illustrated and described, in those instances where gas under pressure is introduced for passage through the ceramic plates to fluidize the overlying bed of material, use may be made of any gas which is reasonably inert at the temperatures and with the materials employed. Air is usually satifsactory and is preferable for reasons of economy. However, in order to avoid oxidation it is sometimes desirable to use nitrogen or some other non-oxidizing gas.

In the operation of the apparatus in its several forms for carrying out the method of the present invention, the pipe or other hollow body, as for example, the pipe 43 or the hollow body 112, is subjected to a suitable heating device so as to raise the temperature thereof to the required degree which is, of course, as hereinbefore set forth, below the deterioration temperature of the body or article being coated and above the sintering temperature of the particles of coating material in the solid pulverulent layer forming mass to be brought into contact with the interior surface thereof.

Any suitable means may be employed for heating the pipe or other hollow body, such for example, as a heating ring illustrated diagrammatically in FIG. 1 and generally designated by the reference character R.

Referring particularly to the embodiment of the invention illustrated in FIG. 1 and following figures relating to this first form, the pipe, either in its heated condition or to be later heated by the ring R, is positioned with its lower end upon the supporting collar 40 and secured in place by the band 45 or any other suitable means so as to form a relatively tight joint or coupling between the end of the pipe and the open end of the neck 39.

The cap 46 is fixed to the top end of the pipe so as to form a relatively tight connection at this location whereby upon the establishing of a reduced pressure in the valved pipeline 49, air may be drawn through the container by way of the inlet 37.

If it should be desirable to coat only a portion of the interior of a pipe or other hollow body, the portions which are to remain uncoated may be masked so as to avoid the work of having to remove the coating material as, for example, in areas which are to be welded or so as to expose markings which may be desirable to leave exposed. It has been found that application to such areas of various silicone resins which are of grease-like consistency, forms an adequate masking thereof.

As a preparatory step to applying the coating, if there is grease or oil contamination on the surface to be coated, a suitable solvent and rinse, such as carbon tetrachloride should be used to remove it.

It is sometimes necessary, in order to improve adhesion of a coating to the articles surface to clean and roughen it as, for example, by sand or metal grit blasting or acid etching. A good base for anchoring the coating is particularly desirable for the inside surfaces of small diameter tubes and pipes or wherever a high degree of concavity of the surface exists which may tend to cause stripping stresses due to shrinking on cooling.

The coating material, as has been stated above, is preferably used in pulverulent form and preferably has an average granular size of between about 0.001 and about 0.024 inch. Best results have been obtained with a granular size of between 0.002 and about 0.012 inch. The period of contact between the fluidized material and the surface of the heated body may vary within relatively wide limits depending upon the thickness of the coating desired. Generally, the time during which such fluidized material is maintained in contact with the surface to be coated is kept below about 50 seconds and preferably below about 30 seconds. When the bed has been lowered from within the hollow body and thus removed from contact with the surface coated, the latter will initially appear to be coated with a powder. After a short interval of time, however, this powder melts or coalesces into a continuous coating due to transfer of heat from the heated article. It will be understood that it is possible to maintain the fluidized powder in contact with the surface of the heated body for an indefinite period during which the bed is maintained in the fluidized state, until the surface is cooled and the coating has solidified. If this is done, the coating will be relatively heavy and will possess a rough, powdery outer surface of powdery coating material which has not fully coalesced and is not entirely coherent to the underlying coating. It will be found, however, that the intermediate portions of the coating between the outermost surface thereof and the innermost portions will possess progressively greater degrees of coalescence and that the intermediate portions will be completely coalesced into a continuous covering. Such coating structure is desirable for some purposes.

If thin walled tubes or other hollow bodies are to be coated, the heat energy therein may sometimes not be sufficient to cause the melting of the powder on the surface of the coating although the zone immediately adjacent to the article has melted and uniformly wetted the article. In such instances higher preheating temperatures can be used or the surface of the coating may be subsequently treated by the application of a suitable flame thereto where the article as a whole may be placed in an oven and heated by any suitable means until the coating is entirely melted. This method may be practiced also to smooth out the coating adhered by the method wherein the article cools while the fluidized material is maintained in contact therewith as hereinabove set forth. Where the hollow article is of a form which permits of the application of an open flame to the coated interior surface, only a few seconds are generally required to smooth off the surface, whereas baking time in an oven should be about 5 to 10 minutes, although the duration of such baking will vary with the materials being used.

A relatively short post-heating period in a relatively hot oven is found to be preferable when the coating substance is a polyamide material, while a longer post-heating in a less high temperature oven is often preferred with other materials. There are certain other materials which may be injured by any post-heating whatsoever.

In the carrying out of the method in that form of apparatus wherein the pulverulent material bed is fluidized by drawing air from the hollow body and thus causing air to flow inwardly from the bottom of the container through the chamber 31, the pulverulent coating material is, of course, placed within the container on the upper surface of the partition and after the hollow body has been fixed in position in the manner described, the air pressure is reduced in the hollow body and in the upper part of the container by the means illustrated and described so that as air enters the chamber 31 it will pass upwardly through the porous partition into the powdery mass causing the powder to be converted into a continuously fluidized bed. This fluidized bed behaves substantially like a liquid so that when the bed is caused to rise into the hollow body its particles come into contact with all parts of the surface thereof. The material in this fluidized condition is made to rise into or enter the hollow body by decreasing the interior area or volume of the container by moving the upper portion 16 downwardly into the lower portion 14. This downward movement of the portion 16 is, of course, effected by means of the pistons 51 working in the cylinders 50, the upper ends of the pistons being connected to the portion 16 as shown. By the provision of a flexible conduit 47 between the collecting chamber or cyclone 48 and the cap 46 which is connected to the hollow body 43, it will be seen that this body can be readily moved up and down as required to bring about the raising of the fluidized bed or the forcing of the fluidized bed into the hollow body.

It will be apparent that it is very desirable that the air or other gas, whether it be drawn into the chamber 31 as above described, or whether it be forced under pressure into the chamber, should pass through the porous plate through many small, closely spaced pores to issue in very minute streams from the pores into the bed of pulverulent material. Accordingly it is important that there be some appreciable degree of resistance to the gas flow through every portion of the porous plate and a measurable pressure drop across the porous plate so as to assure there being an equalization of pressure on the bottom of the plate and a resultant even and equal flow through all portions thereof.

It will also be apparent from the description and illustration of the structure which embodies the two telescopically coupled upper and lower portions that after the upper portion has been lowered and the pulverulent material has been elevated or forced upwardly into the overlying hollow body and maintained therein for the desired length of time and also while being maintained in a fluidized condition, the elevation of the upper portion 16 or its restoration to its initial elevated position will cause the pulverulent material to drop back into the container.

In the second described embodiment of the invention the material container or tank in which the fluidizing action is produced, is shown as being in two parts in the upper portion to be operated in the same manner as the first described form. However, in this second embodiment the gas for effecting the fluidizing action is introduced under pressure through the valved pipe 61, into the lower chamber below the porous plate and the pressure of the gas is controlled or regulated by the valve so as to maintain the bed of material in the proper fluidized condition. The gas supply pressure may be as high as 15 atmospheres depending upon the diameter of the gas connection and the volume of flow. It will be understood, of course, that the rate of gas flow is very dependent upon the size and configuration and design of the apparatus which is used for the practice of the method.

In this second embodiment the pipe 43 is connected at its top end with or has resting thereon the receiver structure 57 which is designed as a collecting receptacle for any of the powder which may be forced beyond the upper end of the pipe when the upper portion of the collapsible container is moved downwardly. Also any dust rising from the powder material will be drawn off through the hood 53 overlying the receiver.

In the third form of the invention described, wherein the ceramic plate 77 is supported for up and down movement within the container 66, it will be seen that the area of the upper portion or chamber is reduced for the same purpose as in the preceding structures, namely, for elevating the powder into the hollow body connected with the top outlet of the chamber, by lifting the entire mass of the powder. Otherwise the operation is carried out in a manner similar to that described hereinbefore.

In this latter form the valve controlling or regulating the inflow of gas into the lower chamber 80 would be manipulated as necessary to increase the gas inflow as the partitioning plate 70 is elevated so as to maintain the proper pressure within the chamber and consequently maintain the powder in the proper fluidized condition.

In the fourth embodiment of the invention the reduction in the volume of the powder containing receptacle is likewise reduced to effect the elevation or upward movement of the powder into the hollow article by collapsing the wall of the tank or container by means of the air or hydraulic cylinders illustrated which are connected to the top of the tank or container. Thus the wall of this tank 100 operates in the nature of a bellows when the top of the container is pulled down and since the hollow body is attached to the open top of the container it will be moved downwardly with the container and the powder will be forced upwardly or elevated into the body.

In the preceding part of the specification a general reference was made to the coupling of the vent 117 to the top of a hollow body such as that shown and designated 112 and while this coupling may be effected in any suitable manner, one means which might be employed, where the opening in the top of the hollow body is unflanged, would be by the provision of a two-part ring or or collar which is generally designated 119 provided with external outwardly opening slots 120 in the parts in which portions of the edge of the opening might be engaged after which the two parts of the split collar might be separated by means of a turnbuckle type coupling 121 located within the collar and having the nut engaging oppositely threaded portions 122 connected with the two parts of the collar. Thus the vent pipe 117 might be engaged at its lower end around the outer side of the collar and fixed thereto in a suitable manner as, for example, by a split clamping ring 123.

In the use of the apparatus in the forms where gas is introduced under pressure into the lower chamber, such gas may be ordinary air, if it is found feasible for economic reasons, but where the possibility of having the coating damaged by oxidation is present, requiring the exclusion of oxygen, particularly where slow cooling may be carried out, nitrogen may be used, as hereinbefore stated, or an inert gas of suitable type.

The range of preheating temperature practical for the process of this invention has a lower limit set by the melting or sintering point of the material adequate to cause adherence to the base, and an upper limit determined jointly by the melting, softening or deterioration temperature of the article, and by the transient decomposition temperature of the coating substance. Within this range it will be found that an article of low heat storage capacity per unit of surface area may advantageously be heated up to the coating material steady-state decomposition temperature.

As a specific illustration of the foregoing, a steel pipe having a wall thickness of 0.300 inch which is to be coated with a coating of about 0.008 inch thickness of high pressure polyethylene, may be preheated to a temperature of about 390° F. to about 430° F. and the pulverulent coating material maintained in contact with the inner surface thereof for about 10 seconds. In spite of the low heat storage capacity of the article to be coated, such preheating gives an ultimate coating of the specified thickness.

As mentioned hereinbefore, the process and apparatus of this invention are adapted for use with articles composed of many different materials and for the application of coatings of many different materials. The following examples, therefore, are set forth merely for the purpose of illustrating how the process may be used for various materials without necessarily limiting the scope of the invention thereto.

*Example I*

A hollow body such as a steel pipe, the dimensions of which are 10 feet long by 4 inches I.D. and 0.118 inch wall thickness can be coated with polyethylene upon its interior surfaces by the present process. The procedure would consist of, first preheating the pipe in an oven at about 690° F. The preheated pipe is then affixed in a vertical position to the filled fluidizing container of polyethylene powder, and this is fluidized and elevated to fill the pipe for a period of about 14 seconds. The fluidizing material consists of pure polyethylene having a particle size of between about 0.0078 inch and 0.0157 inch. Fluidizing gas is nitrogen at a temperature of about 68° F. The thickness of the resulting coating is about 0.030 inch. Such coating is absolutely free from pores, smooth and glossy. A test with an electric spark device at 25,000 volts indicates no breakdown of the coating.

A workable range of preheat temperatures for the article when employing polyethylene as the coating material is from 375° F. to 700° F.

*Example II*

The same materials and the same general process would be used as in Example I. However, the preheating temperature is set at about 535° F. and the contacting time with the fluidized mass of coating powder is about 17 seconds. The thickness of the coating produced is found to be about the same as for Example I.

*Example III*

The same procedure would be followed as in Example I, using the same materials; however, the preheating temperature is about 464° F., and the contacting time is about 21 seconds. The thickness of the coating is approximately equal to that of Examples I and II, illustrating that the coating thickness may be regulated within a wide range by varying the preheating temperature relative to the period of contacting.

*Example IV*

A piece of steel alloy pipe, having a length of 6 feet, an interior diameter of 1.97 inches, and a wall thickness of 0.157 inch, is first roughened internally by sandblasting and is then preheated in an electric oven maintained at a temperature of about 534° F. The workpiece is thereafter coupled to a fluidizing container forming an upward extension thereof and which container has a filling consisting of a mixture of 90 percent by weight polyethylene and 10 percent by weight of polyisobutylene; the bed is fluidized and elevated to fill the pipe and maintained therein for about 23 seconds. The particle size of the coating material is from about 0.0078 inch to about 0.0097 inch; the gas used is compressed air at a supply pressure of about 4 atmospheres.

After the bed is collapsed the pipe is removed and reheated to smooth the coating at a temperature ranging between 255° F. and 302° F. for about 5 minutes. The resultant coating is observed to be smooth and even on both interior and exterior surfaces and is about 0.0354 inch thick.

While there has been shown in a conventional manner a gas fired heating ring burner R, if preferred, other conventional heating devices may be employed. Such device may include, for example, electrical resistance heating elements, radiant heaters or induction or high frequency electrical heaters, etc. It may also be desirable to simply omit the use of such heating devices and to preheat the pipe or other hollow body which is to be coated in a suitable conventional oven prior to assembly of the body on the coating apparatus.

After the internal coating of the body has been effected, the flow of fluidizing gas, whether it be sucked through the structure or forced therethrough under pressure, is shut off and the powdered particles are permitted to fall back through the hollow body into the tank or container.

The following claims are intended to define the valid scope of this invention over the prior art and to cover all changes and modifications falling within the true spirit and valid scope of the invention.

We claim:

1. Apparatus for coating the interior of a hollow elongate body having opposite end openings, comprising a receptacle, a gas pervious partition dividing the receptacle into upper and lower chambers, said partition being adapted to support a body of pulverulent fluidizable material in the upper chamber, means for admitting a gas into the lower chamber for passage through the partition into and through the material in the upper chamber to fluidize the material, said receptacle in the portion thereof forming the upper chamber comprising an upper part and a lower part telescopically joined together whereby the upper part may have up-and-down movement relative to the lower part, means for effecting said up-and-down movement, the said upper part having a top outlet, and means for securing one open end of a hollow body to said upper part in communication with said outlet.

2. The invention according to claim 1, in combination with a pipe as exemplifying the said hollow elongate body, with a cap adapted to fit over the other end of the body, and means including a conduit connected with said cap for drawing a gas from said lower chamber through said partition, through the material in the upper chamber and into and through the pipe.

3. The invention according to claim 1, wherein the said means for admitting a gas into the lower chamber includes a valved pipe for regulating the admission of such gas under pressure from a source of supply, and a dust collecting hood over and in vertically spaced relation with the outlet of said upper part of the upper chamber.

References Cited in the file of this patent

UNITED STATES PATENTS

| | | |
|---|---|---|
| 762,299 | Fulton | June 14, 1904 |
| 1,854,458 | Quincy et al. | Apr. 19, 1932 |
| 2,414,625 | Abrams et al. | Jan. 21, 1947 |
| 2,815,550 | Valyi | Dec. 10, 1957 |
| 2,833,595 | Standish et al. | May 6, 1958 |
| 2,844,489 | Gemmer | July 22, 1958 |
| 2,907,299 | Weiner | Oct. 6, 1959 |
| 2,969,038 | Neumann | Jan. 24, 1961 |
| 2,986,475 | Mesnard et al. | May 30, 1961 |
| 3,004,861 | Davis | Oct. 17, 1961 |
| 3,074,808 | Harrison | Jan. 22, 1963 |
| 3,093,510 | Olson et al. | June 11, 1963 |

FOREIGN PATENTS

| | | |
|---|---|---|
| 1,051,175 | Germany | Feb. 19, 1959 |

OTHER REFERENCES

Kunststoffe, volume 47, November 8, 1957, pp. 510, 511, and 512.